Dec. 15, 1942.  F. V. WILSON, JR., ET AL  2,305,124

JIG TABLE FOR FABRICATING WALL SECTIONS

Filed Jan. 17, 1940  2 Sheets-Sheet 1

INVENTORS
FRANCIS VAUX WILSON, JR.
BY JOHN W. GERMOND.
Albert Sperry
ATTORNEY

Dec. 15, 1942.    F. V. WILSON, JR., ET AL    2,305,124
JIG TABLE FOR FABRICATING WALL SECTIONS
Filed Jan. 17, 1940    2 Sheets-Sheet 2

INVENTORS
FRANCIS VAUX WILSON, JR.
JOHN W. GERMOND.
BY Albert Sperry
ATTORNEY

Patented Dec. 15, 1942

2,305,124

UNITED STATES PATENT OFFICE 2,305,124

JIG TABLE FOR FABRICATING WALL SECTIONS

Francis Vaux Wilson, Jr., Morrisville, Pa., and John W. Germond, Trenton, N. J., assignors to Homasote Company, Incorporated, Fernwood, N. J., a corporation of New Jersey Application January 17, 1940, Serial No. 314,206

4 Claims. (Cl. 144—288)

This invention relates to methods and means for fabricating building sections adapted to be assembled in the erection of a building and particularly to a jig table or work bench and methods of using the same in the fabrication of building sections.

In the copending application of Wilson and Neubeck, Serial No. 206,794, filed May 9, 1938, issued November 18, 1941, as Patent No. 2,262,827, a type of jig table is described in which there are fixed and movable positioning elements adjustable to permit the fabrication of wall sections of different height. While this jig table is very useful it is not readily adapted for the fabrication of non-rectangular wall sections and is not so flexible in use that varying structures of modular design may be fabricated thereon with the desired speed and accurary of operation.

In accordance with the present invention these objections are overcome and a jig table provided wherein the elements are so designed and adjustable that non-rectangular sections may be fabricated thereon and various types of building sections of modular design may be fabricated quickly and easily. Moreover, the methods of fabrication employed result in considerable savings in time and labor which are important items in the cost of constructing building sections.

These advantages of the present invention are attained by providing a jig table with an adjustable guide for determining and defining one end of the section and a movable guide for determining and defining the other end of the section together with improved means for locating the elements used in constructing the framework of the section. In forming non-rectangular sections additional means are employed in conjunction with the guides for indicating and establishing the pitch or inclination of elements used in forming non-rectangular portions of the section.

In order to facilitate the use of a jig table embodying the present invention when fabricating sections of modular design novel means are provided for locating the guide members in predetermined relative positions which insure accuracy of construction upon modular principles of design.

One of the objects of the present invention is to reduce the amount of time and labor required for the fabrication of wall sections.

Another object of the invention is to provide novel methods and means for constructing prefabricated wall sections adapted to be assembled in the erection of a building.

A further object of the invention is to provide an improved form of jig table for use in the fabrication of building sections.

Another object of the invention is to provide a jig table with adjustable and movable guide means for establishing and defining the ends of building sections.

A further object of the invention is to provide a jig table for use in fabricating wall sections of non-rectangular form.

These and other objects and features of the present invention will appear from the following description thereof in which reference is made to the figures of the accompanying drawings.

Figure 1:
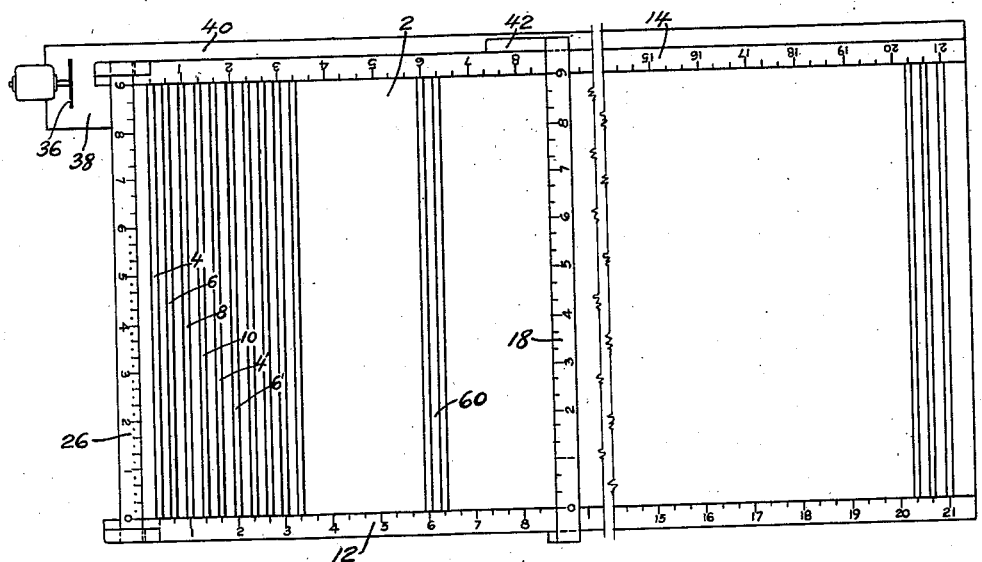
Fig. 1 is a plan view of a typical form of jig table embodying the present invention.

The jig table illustrated in the figures of the drawings is adapted for use in the construction of wall sections of modular design and is described as used when employing a four inch modulus. The jig table has a flat base or working surface 2 supported on legs 5 with the working surface of the base laid off with a plurality of series of parallel markings of different colors with the markings arranged so that the center lines thereof are spaced four inches apart and in regular succession throughout the length of the table. In practice the stripe 4 is red, the stripe 6 is white, the stripe 8 is yellow and the stripe 10 is black. The stripe 4' is then made red, strip 6' white, etc., so that stripes of the same color but in successive series are spaced 16 inches apart to facilitate the placing of studs or other elements used in building wall sections without accurately measuring to locate the studs in position.

A fixed guide 12 extends along the front edge of the jig table as shown in Fig. 1 and is laid off with modular dimensions and foot markings as shown. A similar fixed guide 14 is located at the rear of the table and extends throughout the length thereof. Positioning means are spaced modular distances apart throughout the length of the table and may conveniently be in the form of holes 16 in the front edge of the fixed guide 12 and in the rear edge of the fixed guide 14.

Figure 4:
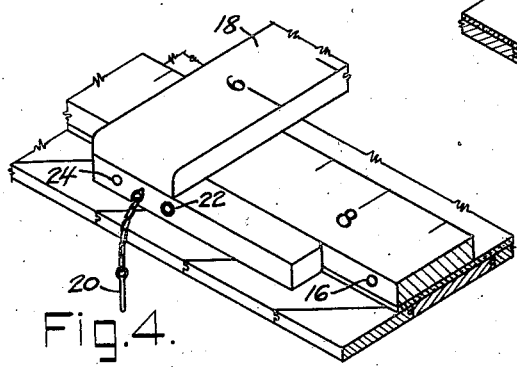
Fig. 4 is an enlarged perspective of another portion of the construction illustrated in Fig. 1 showing another detail thereof.

A movable guide 18 extends across the table at right angles to the fixed guides 12 and 14 and is movable lengthwise of the table to any desired position. In order that the movable guide 18 may be located in modular positions, means are provided which cooperate with the positioning means 16 to hold the movable guide in place. As shown in Fig. 4 the holding means are in the form of an eye bolt 20 carried by the movable guide 18 and adapted to be passed through a hole 22 in the movable guide to enter a selected hole 16 in the fixed guide. Similar holding means are employed at each end of the movable guide to insure proper positioning thereof. For reasons explained more fully in our copending application Serial No. 286,840, filed July 27, 1939, it frequently is necessary in the construction of modularly designed wall sections to position elements thereof non-modular but related distances apart. Thus in forming overlapping sections the length of the section is usually made a whole number of moduli in length—less $\frac{3}{16}$ inch. In order to locate the movable guide 18 in a predetermined position as required under such circumstances a second hole 24 is provided in the movable guide for receiving the holding means 20 to locate the movable guide in such a related position.

Figure 3:
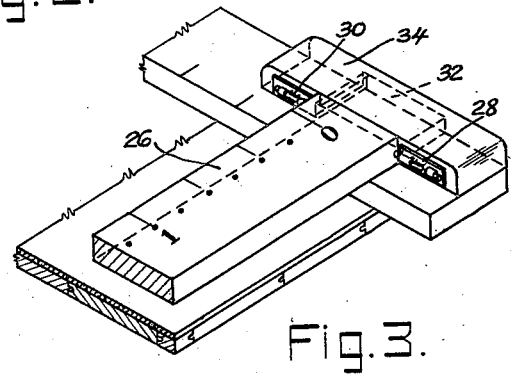
Fig. 3 is an enlarged perspective of a portion of the construction shown in Fig. 1 illustrating a detail thereof.

As shown in Fig. 1 an adjustable guide 26 is located at the left hand end of the table and extends from the fixed guide 12 to the fixed guide 14 parallel to the markings 4, 6, 8, 10 etc. and parallel to the movable guide 18. Means are provided for holding the adjustable guide in either of two predetermined positions so that it will be located in a zero position spaced a modular distance from the markings 4, 6, 8, 10 etc. or will be spaced a non-modular but related distance from the markings on the table as described above. The holding means employed for positioning the adjustable guide 26 are illustrated in Fig. 3 and are in the form of slidable lock bolts 28 and 30. The end 32 of the adjustable guide 26 in reduced and extends into an enlarged opening in the fixed end block 34. The lock bolt 28 when moved to its projected position serves to hold the adjustable guide 26 in its modular position whereas the lock bolt 30 when moved to its projected position serves to hold the adjustable guide in a predetermined non-modular but related position.

In order to facilitate the forming of elements to be used in the construction of wall sections a power saw or other cutting member 36 is positioned a predetermined distance from the zero marking on the table corresponding to the inner face of the adjustable guide when in its modular position. A support 38 serves to receive the element to be cut and is located flush with the surface 40 adjacent the rear edge of the fixed guide 14. A positioning member 42 is secured to the end of the movable guide 18 which projects over the surface 40 as shown in Fig. 4 and projects to the left from the inner face of the movable guide a distance equal to the spacing of the cutter 36 from the zero marking on the jig table. Thus when the movable guide has been located in position a timber may be slid along the surface 40 into engagement with the end of the positioning member 42 so as to be located in position to be cut by the saw 36 to a length exactly equal to the distance between the inner faces of the adjustable guide 26 and the movable guide 18.

Figure 5:
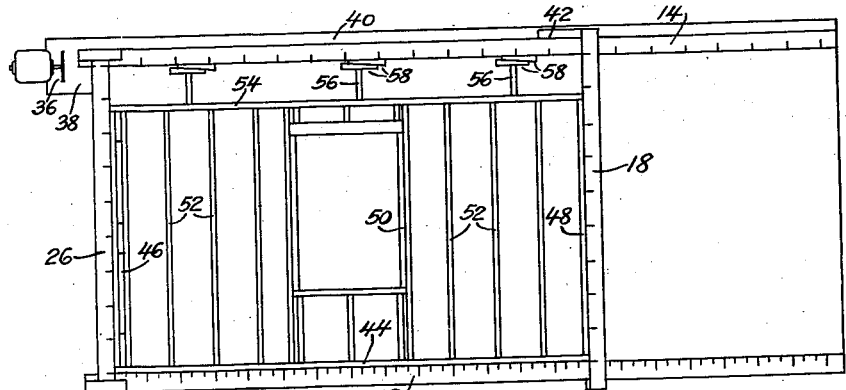
Fig. 5 is a plan view of the jig table with the elements of a rectangular building section assembled thereon.

In constructing a rectangular building section as shown in Fig. 5 the adjustable guide 26 and the movable guide 18 are secured in place by their respective holding means in the proper spaced relation to form a wall section of the length indicated by the plans being followed. A bottom plate 44 is then cut from a timber by placing it on the surface 40 adjacent the end of the positioning member 42 carried by the movable guide 18 and actuating the saw 36 located adjacent the support 38. The bottom plate is placed against the fixed guide 12 as shown at 44 in Fig. 5, an end sub-assembly 46 is located adjacent the adjustable guide 26 and an end stud 48 is located adjacent the movable guide 18. The opening sub-assembly 50 is then placed in the position indicated by the house plan used in constructing the wall section. Thereafter the studs 52 are placed in position on either side of the opening sub-assembly by simply locating them on the similarly colored lines 6, 6' etc. or 8, 8' as required to provide the usual 16 inch spacing of the studs. A top plate 54 is cut in the same manner as was the bottom plate 44 and is placed in position adjacent the upper ends of the sub-assemblies and studs and the elements are secured in place by placing spacing blocks 56 between the top plate 54 and the fixed guide 14. Wedges 58 are then driven into place to hold the elements of the building section together and the elements are then permanently secured by means of nails or otherwise. Wall covering material such as wall board also may be applied to the framing of the building section before it is removed from the jig table and any openings or passages formed for wiring, water or steam pipes or the like or such pipes and wiring may be installed directly in the wall section as it is constructed.

Figure 6:
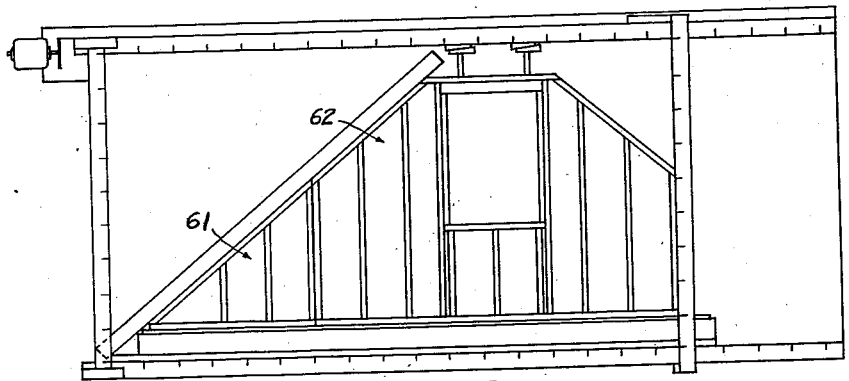
Fig. 6 is a view similar to Fig. 5 showing the elements of non-rectangular building sections assembled on the jig table of Fig. 1.

In forming a non-rectangular building section of the type illustrated in Fig. 6 it is frequently desirable to construct a plurality of sections on the table at the same time. Thus a small gable triangle section indicated at 61 in Fig. 6 and shown in detail in Fig. 7 may be constructed in conjunction with a center gable section shown at 62 in Fig. 6.

Figure 2:
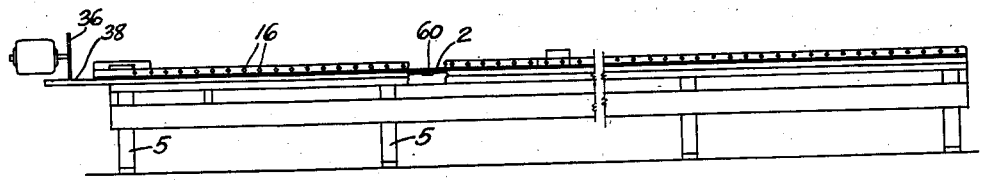
Fig. 2 is a view in elevation of the construction illustrated in Fig. 1 with a portion thereof shown in section.
Figure 7:
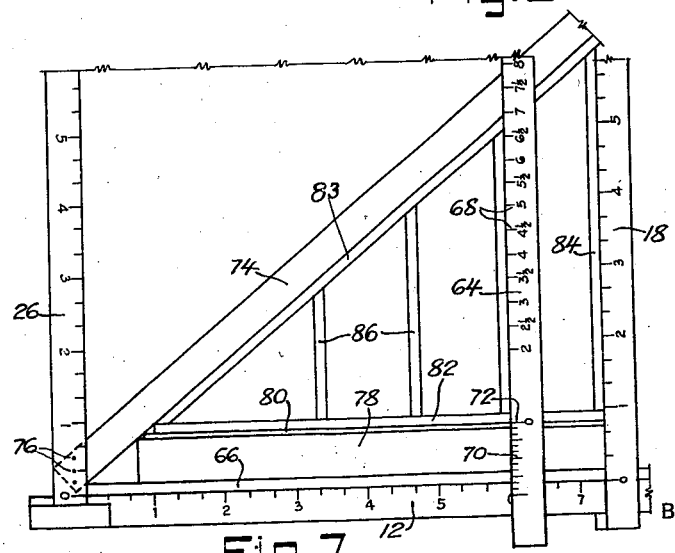
Fig. 7 shows a portion of the construction of Fig. 6 illustrating the manner of assembly of the elements to construct a non-rectangular wall section.

For constructing non-rectangular sections a nailing strip 60 is set into the base 2 of the jig table as shown in Fig. 2 so that the upper face of the nailing strip is flush with the surface of the base and a pitch gauge 64 shown in Fig. 7 is used. The method of assembling the elements of all non-rectangular sections is essentially the same but the manner in which the bottom plate of the section is located depends upon whether the section is to have a "raised plate" or a "dropped plate." In assembling the elements of wall section having a "dropped plate" the parts are arranged as shown in Fig. 7. For this purpose the movable guide 18 is first moved to the right out of the way and a piece of stock 66 corresponding in thickness to the top plate of a lower story wall section and here referred to as an "artificial top plate," is placed in contact with the fixed guide 12 and with the end thereof adjacent the adjustable guide 26. The pitch gauge 64 is then located parallel to the adjustable guide in a predetermined position, say 6 feet from the adjustable guide. The pitch gauge is laid off with markings 68 which indicate the angular measurement or pitch to be given the roof or other inclined portion of the building section whereas the lower portion of the pitch gauge is provided with markings 70 for locating the pitch gauge in such position with respect to the fixed guide 12 that the zero indication 72 on the pitch gauge will be spaced from the fixed guide 12 a distance equal to that by which the non-rectangular section is to be spaced from a lower story wall section when the sections are assembled in the erection of a building.

With the pitch gauge thus positioned a timber 74 referred to hereafter as a "jig rafter" is placed with one end thereof beneath the adjustable guide 26 and in contact with the end of the artificial top plate 66. The other end of the jig rafter is then moved until the lower face thereof is located beneath the marking 68 on the pitch gauge which corresponds to the pitch to be given an element of the non-rectangular wall section. The jig rafter is then secured in place by driving nails through holes 76 in the adjustable guide 26 and by driving nails through the jig rafter into the nailing strip 60 in the base of the jig table. The pitch gauge is then removed and the movable guide 18 placed in position to define the right hand end of the wall section. Thereafter an "artificial joist" 78 is moved into place until it engages the jig rafter as shown in Fig. 7 and a member 80 serving as "artificial rough flooring" is applied over the artificial joists 78. The upper edge of the member 80 then coincides with the zero marking 72 on the pitch gauge.

The base plate 82 of the non-rectangular wall section is then placed against the artificial rough flooring 80 with the end thereof in engagement with the jig rafter 74. The rafter 83 is then cut and placed against the jig rafter 74 and an end stud 84 is placed against the movable guide 18. Thereafter the studs 86 are located in place on 16 inch centers as indicated by the correspondingly colored markings 4, 4', 6, 6' etc. on the base.

In a similar way the elements of the center gable section 62 may be assembled on the jig table and the elements of both sections held in place by spacing blocks and wedges as shown in Fig. 6. The elements of the sections then are secured together by nailing or otherwise and wall board may be applied thereto to complete the wall sections.

When forming a non-rectangular section having a "raised" plate the artificial joist and artificial rough flooring are omitted and the pitch gauge is positioned with the zero marking 72 thereon even with the inner edge of the fixed guide 12. The manner of constructing and assembling the elements of the wall section is the same as when constructing a non-rectangular section having a "dropped plate."

The jig table described and the manner of assembling elements thereon to form either rectangular or non-rectangular wall sections are capable of adjustment to form wall sections of any desired size, shape or configuration. Furthermore, the positioning of the guides to locate the elements of the wall section and the positioning of the studs and other elements used in the construction of the wall section can be effected quickly and without laying off or measuring the elements as has been required heretofore.

Furthermore, the ease with which the adjustable and movable guides may be displaced to non-modular but related positions to insure the proper fitting of wall sections with each other is of great advantage in the construction of modularly designed wall sections.

While the invention has been described and shown in the drawings as applied to a jig table designed for fabricating wall sections using a 4 inch modulus it will be apparent that the construction may be used in fabricating wall sections using any other modulus and various principles of the construction may be employed in the fabrication and assembly of elements to construct wall sections which are not necessarily of modular design. Since the invention is capable of numerous modifications and changes in construction and in the manner of using the same it should be understood that the particular embodiments of our invention shown in the drawings and described above are intended to be illustrative of our invention and are not intended to limit the scope thereof.

We claim:

1. A jig table for use in fabricating building sections of modular design, said table having a working surface, guide means mounted on said table and located above and adjacent said working surface in positions to locate marginal elements of a section to be produced, two of said guide means being parallel and relatively movable, means for securing said two guide means in predetermined positions with respect to said table and in modularly spaced relation, and a plurality of indicating means located on said working surface and extending across an area defined by said guide means parallel to said two guide means, said indicating means being formed and arranged in a plurality of recurring series of different colors and each spaced a modular distance from adjacent indications whereby indications of the same color are spaced apart distances equal to a predetermined multiple of the modulus to indicate the positions in which elements of the section spaced from said guide means are to be located.

2. A jig table for use in fabricating non-rectangular building sections, said table having a working surface with a fixed guide located above and adjacent said table to locate one element of a section to be constructed, parallel relatively movable guides extending at right angles to said fixed guide, means for locating one of said relatively movable guides a predetermined distance from the other and in position to locate another element of said building sections, a pitch gauge located a predetermined distance from said other relatively movable guide and graduated to indicate the pitch of lines drawn to said pitch gauge from the point of intersection of said other relatively movable guide with the fixed guide, and a jig rafter removably secured to said working surface with a part thereof located at said intersection, a part located adjacent a predetermined graduation on the pitch gauge and a part thereof located adjacent the other movable guide to locate a third element of said section.

3. A jig table for use in constructing non-rectangular building sections of modular design, said table having a working surface, a fixed guide located above and adjacent said working surface in position to locate one element of a section to be constructed, a second guide extending at right angles to the fixed guide near one end of the table, indicating means spaced modular distances apart and extending across said working surface parallel to said second guide means, a pitch gauge located adjacent a predetermined one of said indicating means and graduated to indicate the pitch of lines extending to the pitch gauge from the intersection of said fixed and second guide means, a third guide means extending parallel to the second guide means and located above and adjacent said working surface to position another element of the section to be constructed, means for securing said third guide means in position adjacent a predetermined one of the indicating means on said working surface, and a jig rafter removably secured above and adjacent said working surface with one portion of the jig rafter adjacent said intersection, another portion adjacent a predetermined graduation on said pitch gauge and a third portion adjacent the third guide means to locate a third element of the section to be constructed.

4. A jig table for use in fabricating non-rectangular building sections comprising fixed guide means for locating one element of a section to be constructed, a second guide means extending at right angles to the fixed guide means, and a pitch gauge extending parallel to said second guide means and spaced a predetermined distance therefrom, said pitch gauge having graduations thereon extending in one direction from a zero point to indicate the pitch of lines extending to the pitch gauge from the point of intersection of said fixed and second guide means, and having graduations thereon extending in the opposite direction from said zero point to indicate the distance in which said element of the section to be constructed is spaced from the fixed guide means.

FRANCIS VAUX WILSON, Jr.
JOHN W. GERMOND.